US006708033B1

(12) United States Patent
Linkola et al.

(10) Patent No.: US 6,708,033 B1
(45) Date of Patent: Mar. 16, 2004

(54) CHANGE OF SERVICE PROFILE OF MOBILE SUBSCRIBER

(75) Inventors: Janne Linkola, Seattle, WA (US); Tuomo Hokkanen, Helsinki (FI)

(73) Assignee: TeliaSonera Finland OYJ, Helsinki (FI)

( * ) Notice: Subject to any disclaimer, the term of this patent is extended or adjusted under 35 U.S.C. 154(b) by 246 days.

(21) Appl. No.: 09/638,484

(22) Filed: Aug. 14, 2000

Related U.S. Application Data

(63) Continuation of application No. PCT/FI99/00117, filed on Feb. 12, 1999.

(30) Foreign Application Priority Data

Feb. 13, 1998 (FI) .................................................. 980331

(51) Int. Cl.$^7$ ........................... H04M 3/42; H04M 3/00; H04Q 7/20
(52) U.S. Cl. ....................... 455/440; 455/414; 455/418; 455/407; 455/433; 455/456
(58) Field of Search ................................. 455/403, 406, 455/407, 414, 418, 424, 425, 432, 436, 440, 550, 551, 556, 419, 422, 433, 443, 456

(56) References Cited

U.S. PATENT DOCUMENTS

| | | |
|---|---|---|
| 5,428,666 A | 6/1995 | Fyfe et al. |
| 5,448,622 A | 9/1995 | Huttunen |
| 5,568,153 A | 10/1996 | Béliveau |
| 5,657,373 A | 8/1997 | Hermansson et al. |
| 6,038,445 A * | 3/2000 | Alperovich et al. ........ 455/422 |
| 6,134,446 A * | 10/2000 | Sasuta et al. ............... 455/456 |
| 6,148,197 A * | 11/2000 | Bridges et al. ............. 455/432 |
| 6,285,450 B1 * | 9/2001 | Thomas et al. ............. 356/244 |
| 6,449,479 B1 * | 9/2002 | Sanchez ...................... 455/433 |
| 6,556,823 B2 * | 4/2003 | Clapton et al. ............. 455/422 |

FOREIGN PATENT DOCUMENTS

| | | |
|---|---|---|
| WO | WO 97/36436 | 10/1997 |
| WO | WO 98/08354 | 2/1998 |
| WO | WO 98/24257 | 6/1998 |

* cited by examiner

Primary Examiner—Nay Maung
Assistant Examiner—Edan Orgad
(74) Attorney, Agent, or Firm—Cohen, Pontani, Lieberman & Pavane

(57) ABSTRACT

A system for changing the service profile of a mobile subscriber includes a location part (31), a evaluation part (32) and a subscriber connection exchange part (33). Besides these, the home location register contains such individual subscriber connections for the subscriber, which have a different service profile. The duty of the location part is to find out the location of the mobile station in the network and to give location information to the evaluation part. The information may be e.g. a location area identity, cell identity or switching centre area identity which is used in the public land mobile network. The evaluation part checks to find out whether the location information has changed compared with the location information received earlier. If it has, it searches the memory for the corresponding location information and compares the connection information in the record with the current connection information. If the connection information is identical, the process remains waiting for new location information. If the connection information is different, the evaluation logic deduces that the connection must be exchanged for a new one and a connection exchange operation must be started. This may take place so that the connection exchange part disconnects the mobile station from the network and reconnects to the network using a new MSISDN number. The algorithms and encryption keys relating to this number it fetches from the memory. The network fetches from the home location register the subscriber information relating to this MSISDN number and along with this also the service profile relating to this number. It is most advantageous to implement the location part, the evaluation part and the subscriber connection exchange part on the subscriber identity module (SIM).

23 Claims, 7 Drawing Sheets

| LAC a | MSISDN 1 | SPECIAL CONDITIONS 1 |
| --- | --- | --- |
| LAC b | MSISDN 2 | SPECIAL CONDITIONS 2 |
| LAC c | MSISDN 3 | SPECIAL CONDITIONS 3 |
| LAC d | MSISDN 4 | SPECIAL CONDITIONS 4 |
| LAC e | MSISDN 5 | SPECIAL CONDITIONS 5 |

CHANGE OF SERVICE PROFILE OF MOBILE SUBSCRIBER

This is a continuation of PCT application No. PCT/FI99/00117, filed Feb. 12, 1999, which claims priority from Finland application No. 980331, filed: Feb. 13, 1998.

FIELD OF THE INVENTION

This invention concerns changing of the service profile of a mobile station subscriber in a public land mobile network, wherein the subscriber may move freely from one location area to another and wherein there are functions to determine the subscriber's location with at least location area precision.

BACKGROUND OF THE INVENTION

Referring to FIG. 1, the following is a brief description of the structure and operation of a public land mobile network (PLMN). The names of network elements are the same as in the known GSM mobile network. Other digital mobile networks include the same network elements as those used in the GSM network. Communication between a mobile station (MS) in a cell and the network takes place via the radio path by way of a base transceiver station (BTS). Base transceiver stations BTS are connected to a base station controller (BSC). One base station controller BSC usually controls several base transceiver stations BTS, which may be chained to one another or cabled directly to the base station controller, as is illustrated in the FIGURE. The geographical area covered by these base transceiver stations is called location area (LA). Each location area has its own unambiguous location area identity (LAI), and the traffic of mobile stations located within the area goes through the base transceiver stations of the area and through the base station controller controlling the location area. FIG. 1 shows three location areas. The mobile station may move in the location area without any need to update the location information concerning itself.

Several base station controllers are connected to one mobile switching centre (MSC). The entity of location areas under the mobile switching center's control is called the mobile services switching centre area. If the public land mobile network includes several mobile switching centers, then their switching center areas together form a PLMN area, which means the geographical area covered by one network. The network is run by one operator almost in all cases.

The public land mobile network also includes various databases.

In the home location register (HLR), of which there may be several, the in formation on subscribers is stored permanently irrespectively of the current location of the subscriber. The visitor location register (VLR) is nowadays integrated with the mobile switching centre, and it stores subscriber information fetched from a home location register while the subscriber visits the VLR's area, that is, the mobile services switching centre area. For example, in FIG. 1, subscriber information relating to mobile station MS located in location area LA is stored in visitor location register VLR located in connection with mobile switching centre MSC.

Location update is always done when the subscriber connects to the network and always when the subscriber moves from one location area to another. Location update may also be done periodically at certain intervals. This is called periodic location update. After the location update the HLR knows the address of that VLR in the relating switching centre area of which the subscriber is located, and the VLR knows the identity of that location area in which the mobile station is located. When the subscriber is moving anywhere in the network, this information will be updated.

Reference is still made to FIG. 1 and also to FIGS. 2A–2C. FIG. 1 is a brief illustration of that numbering information which is essential to the invention and which the different network elements have, as well as the numbers stored on the subscriber identity module of the terminal equipment. FIGS. 2A–2C show the contents of numbers.

FIG. 2A shows the content of the location area identity. The identity is formed by the mobile country code (MCC), for Finland that code is 244, by the mobile network code (MNC), in Finland 91, and by the location area code (LAC). Thus, the operator's location area identities differ from each other only as regards the LAC code. Location area identity LAI is in the memory of base station controller BSC of this area. When the mobile station is in some location area, it has also received location area identity LAI of this location area from the network and it has stored it in its own memory.

The mobile station's SIM module stores the mobile station's connection number (telephone directory number) MSISDN, the contents of which are in accordance with FIG. 2B. It is formed by the country code (CC), which is 358 for Finland, by the national destination code (NDC), which for the operator "Sonera" in Finland is 40 or 400 and by the subscriber number (SN). What is essential is that a mobile station subscriber may have several MSISDN numbers, because in actual fact the number defines the service used and not the telephone equipment itself.

FIG. 2C shows an IMSI (International Mobile Subscriber Identity) which is a special subscriber identity number, which is used both for identifying the subscriber and for security purposes. When doing a location update and always when asking for a channel from the network, the mobile station will send its IMSI number to the network, and only after the network and the mobile station have agreed on encryption of the radio link the mobile station will send its MSISDN number encrypted to the network. When doing a location update, the mobile switching centre/visitor location register use IMSI number when asking for subscriber information from the home location register. What is essential is that the subscriber in most cases has only one IMSI number, although there may be several MSISDN numbers. Home location register HLR is the place where these numbers are tied to each other.

Based on the description referring to FIGS. 1 and 2A–2C, home location register HLR always stores the subscriber's connection number/numbers MSISDN, the subscriber's international mobile subscriber identity IMSI and the address of that visitor location register VLR, where the subscriber is located. Besides the subscriber's MSISDN number and IMSI number, the visitor location register also stores location area identity LAI and thus also the location area code of that location area where the subscriber is located at the moment. Mobile station MS stores the MSISDN and IMSI numbers and location area identity LAI. In addition, the mobile station stores the subscriber's encryption parameters. When the MS is moving from location area a to location area b in FIG. 1, only the LAC code will chan memories of the mobile station and the base station controller and in the visitor location register. No changes take place in the home location register.

In digital PLMN systems traffic on the radio path is encrypted. For this purpose, an authentication and encryption procedure is performed in the beginning of the call setup using different algorithms and encryption keys. The simplified events in the GSM system are such that the mobile station sends its IMSI identity (or its temporary TMSI identity) to the network. Before traffic starts, authentication is performed by using a special identification algorithm stored in the mobile station as well as subscriber-specific identification key $K_i$. In the early part of the authentication, the network sends a random number to the mobile station. Using this and subscriber-specific key $K_i$ in the module the mobile station carries out an identification algorithm. The mobile station uses the received random number and the $K_i$ value also for calculating connection-specific encryption key Kc. In this calculation another algorithm is used which is stored in the subscriber identity module. This encryption key is used as a key to a third algorithm which is stored in the subscriber identity module and which is then used for encrypting speech and data transmission over the radio path. With the same values the network performs the same algorithms and thus obtains the same encryption key as the result. Both store the key in their memory.

The mobile station always sends the MSISDN number encrypted. When the mobile switching centre has received the number, it may inquire from the home location register to learn what kind of services relate to this MSIDN number.

In actual fact, mobile station MS is formed by two parts: by the mobile equipment (ME) and by the subscriber identity Module (SIM), so functioning mobile station MS is formed only by inserting the SIM module into mobile equipment ME. The above-mentioned MSISDN, IMSI, subscriber-specific key K, and the algorithms needed in authentication and encryption are all stored permanently on the subscriber identity module, which the subscriber receives from the operator when subscribing to the network. The algorithms are carried out on the SIM module, so that the $K_i$ key need never be transferred between the SIM module and mobile equipment ME.

Mobile operators provide subscribers with a lot of different services. In the following some examples will be given as a list. The short message service is specified in the standard and using this the mobile subscriber may leave and receive messages of a certain length. Faxes may be sent and received in the fax answering service. In the availability service, calls are directed immediately forward to the number given by the subscriber, if the mobile subscriber can not be reached. Call forwarding differs from the availability service in that the subscriber himself and using his own mobile station states the number to which calls may be forwarded. In the answering service the call is directed to an answering machine, if not answered within a certain time, when the telephone is closed or outside the service area. The caller may dictate his message to the answering machine and the subscriber may listen to it when he likes. In the secretary service, the call is directed to a secretary, who receives the messages and tells the caller about any notifications given by the subscriber. In addition, various services relate to the pricing of a call, such as a) a detailed bill service, whereby the subscriber receives the duration and prices of made calls together with the bill, b) a payer specification, wherein by a code placed before the number of the called subscriber information can be given on whether the call is a business call or a private call. In addition, the mobile subscriber may order from the operator various services relating to a limitation of outgoing and incoming calls.

Some services are free of charge and some entail a charge. Since there are many services, the operator usually offers some basic services to the subscriber free of charge, but the subscriber has to order such services himself which entail a charge. The subscriber chooses the services he wants and the operator stores the information on which services the subscriber is entitled. to in the subscriber information of the home location register. The entity of these entitled services is called the service profile in this application. Thus, each subscriber has his own service profile. The service profile is tied to the subscriber connection, in practice to the MSISDN number.

It was said above that a subscriber may have several MSISDN numbers. In this connection several ways of using this feature have been presented. The U.S. Pat. No. 5,448,622, Huttunen, presents a mobile station, in the memory of which several telephone numbers are stored. They may be in use at the same time. Hereby, when a call comes, the call number is seen in the display, so the subscriber sees to which number the call is and he may answer it or not answer it. Through the operating connection the subscriber may activate a set of telephone numbers, where incoming calls are answered, and likewise through the operating connection the subscriber may choose which number is to be used in outgoing calls. Thus, the service profile is formed mainly by a chosen set of MSISDN numbers.

The U.S. Pat. No. 5,657,373, Hermansson et al, presents a system, where for each subscriber connection there are one subscriber number and at least two subscriber identity modules (SIM), which when inserted into the telephone will open the telephone for traffic. When there are two modules, one may be a full-sized module and the other a small size module, whereby both may be in the telephone at the same time. Opening of a subscriber connection takes place so that when one module is activated for incoming and outgoing calls, other modules are deactivated. Activating and deactivating of modules takes place in home location register HLR, whereby the subscriber must ask the operator to carry out the change work. Although there is only one subscriber number, each module has different IMSI, which is also stored in the subscriber information of the home location register. The home location register connects the subscriber number to that IMSI number in the subscriber information, which belongs to the module which is to be activated. Using the method presented in this patent it is possible in principle for each IMSI number to bring about a service profile of its own, whereby the subscriber would have several different service profiles. Hereby the subscriber would change his service profile by asking the operator to link up a MSISDN number with a desired IMSI number in the home location register. Thereupon he would insert the module having the said IMSI number into his mobile equipment.

U.S. Pat. No. 5,428,666, Fyfe, presents an arrangement by which a mobile station may use services of several different cellular systems. This happens in such a way that the mobile station has a memory containing several NAMs (Number Assignment Module). Each module contains data containing the number of the mobile station, the identity of that system whose services may be requested by using this telephone number and a certain set of control channel identities of this system. When the user wishes to use services of a certain system, he enables the module concerning this system, whereby the mobile station scans the control channels stated in the module and chooses the most powerful one of them. Thereupon the NAM system identity decoded from the chosen control channel is compared with the identity stored in the module, and when they are identical, access to the concerned system is granted. In this case the service profile could be formed so that the subscriber would agree with the different system operators on a profile in the concerned system and he would put the desired profile in use by activating the NAM module containing the identity of the system in question. The advantage is greatest the more the coverage of the systems is mutually overlapping.

There are some drawbacks in the changing of the service profile made possible by the prior art publications described above. In the solution according to Huttunen's patent it is possible at least in theory to connect with each MSISDN number a service profile of its own. However, the user would have to choose the number he desires through the operating connection and, in addition, he would have to remember what kind of profile is connected with each number. According to the patent of Hermansson et al., several subscriber identity modules are required, and when use of a service profile relating to a certain subscriber identity module is required the operator must be asked to make the changes needed in the home location register. Making the change in the home location register takes its own time. When using the solution proposed by Fyfe, it is not possible at all to change the service profile when using the subscriber connection of the same operator.

It is a common feature of all that changing of the service profile does not take place automatically and that changing is slow. It should also be noticed that in a manual change of the service profile the dependence on the location is not taken into account at all, but the subscriber may choose any predetermined profile. Hereby the operator has no chance to influence the loading of the network by way of the service profile.

However, it is desirable in some situations even quite quickly to change even a big part of the services of a connection. From the operator's viewpoint this would be especially advantageous if the profile could be tied to the mobile subscriber's current location in the network. Hereby a profile would be available to the subscriber in a certain part of the network while another profile would be available to him in another part of the network. For example, fast data transmission could be made permissible for the subscriber in areas with a scarce population only, but not in city centres where there are not so many traffic channels available or where at least occasionally there occurs a shortage of free channels.

An objective of the present invention is thus a system in which the mobile subscriber's service profile changes automatically and depending on the place, in other words, a system allowing place dependence of services tied to a mobile station connection.

The established objective is achieved by the definitions presented in the independent claims.

SUMMARY OF THE INVENTION

The system includes three functional parts located in the mobile station: a location part, an evaluation part and the subscriber connection exchange part. In addition to these, the home location register contains individual subscriber connections with a different service profile.

The duty of the location part is to make clear the mobile station's location in the network and to give the location information in a suitable form to the evaluation part. The location part preferably uses a feature already existing in known public land mobile networks, that is, that the mobile station receives such parameters from the network from which the location data may be deduced with a different precision. Such parameters relating to the location information are e.g. the country code, the operator identity, the switching centre identity, the cell identity, the location area identity etc. The location part gives one parameter to the evaluation part as location data, or alternatively it may give a set of parameters.

Alternatively, the location part may be implemented by using any known method of location a mobile station.

The evaluation logic part contains a memory. The memory may be a number assignment module NAM storing a desired quantity of location data in the same form as is given by the positioning part. To each location data relates connection data, which may be a MSISDN number, if the subscriber has several MSISDN numbers but only one IMSI number, or an IMSI number, if the subscriber has several IMSI numbers but only one MSISDN number. In addition, to each connection data relates data containing special conditions. Each piece of location data, connection data and special data may form one record which is stored in the NAM module.

When the evaluation logic receives location data from the location part, it checks if the location data has changed compared with the location data received earlier. If it has, it searches the memory for the corresponding location data and compares the connection data in the record with the current connection data. If the connection data is identical, the process will wait for new location data. If the connection data is different, the evaluation part deduces that the connection must be exchanged for a new one and that a connection change operation must be started. However, prior to this it checks the record to find out whether any special conditions relate to a change of connection. Desired limitations concerning the change of connection may be laid down in the special conditions. For example, a certain number of identical location data must be received, whereby a hysteresis is achieved as regards the change. It may also be a condition that the connection may not be changed while a call is going on. Only after the evaluation part has decided that the connection is to be changed, it will give a connection change command to the connection exchange part. The exchange command contains the MSISDN number of the new connection.

The connection exchange part begins the connection exchange operation in response to the received command. This may take place in such a way that it disconnects the mobile station from the network and reconnects to the network using a new MSISDN number. The algorithms and encryption keys relating to this number it fetches from the memory, which may be common with the evaluation logic part. The network searches the home location register for subscriber data relating to this MSISDN number and along with this also the service profile relating to this number. Authentication is performed in the normal manner, and after the registration the subscriber may begin traffic on the new connection and using the service profile relating to this connection.

All three functional parts in the mobile station: the location part, the evaluation part and the subscriber connection exchange part, are preferably implemented in the subscriber identity module SIM.

BRIEF DESCRIPTION OF THE DRAWINGS

The invention will be described in greater detail with the aid of the appended schematic drawings, in which.

DETAILED DESCRIPTION OF THE INVENTION

Figure 3:
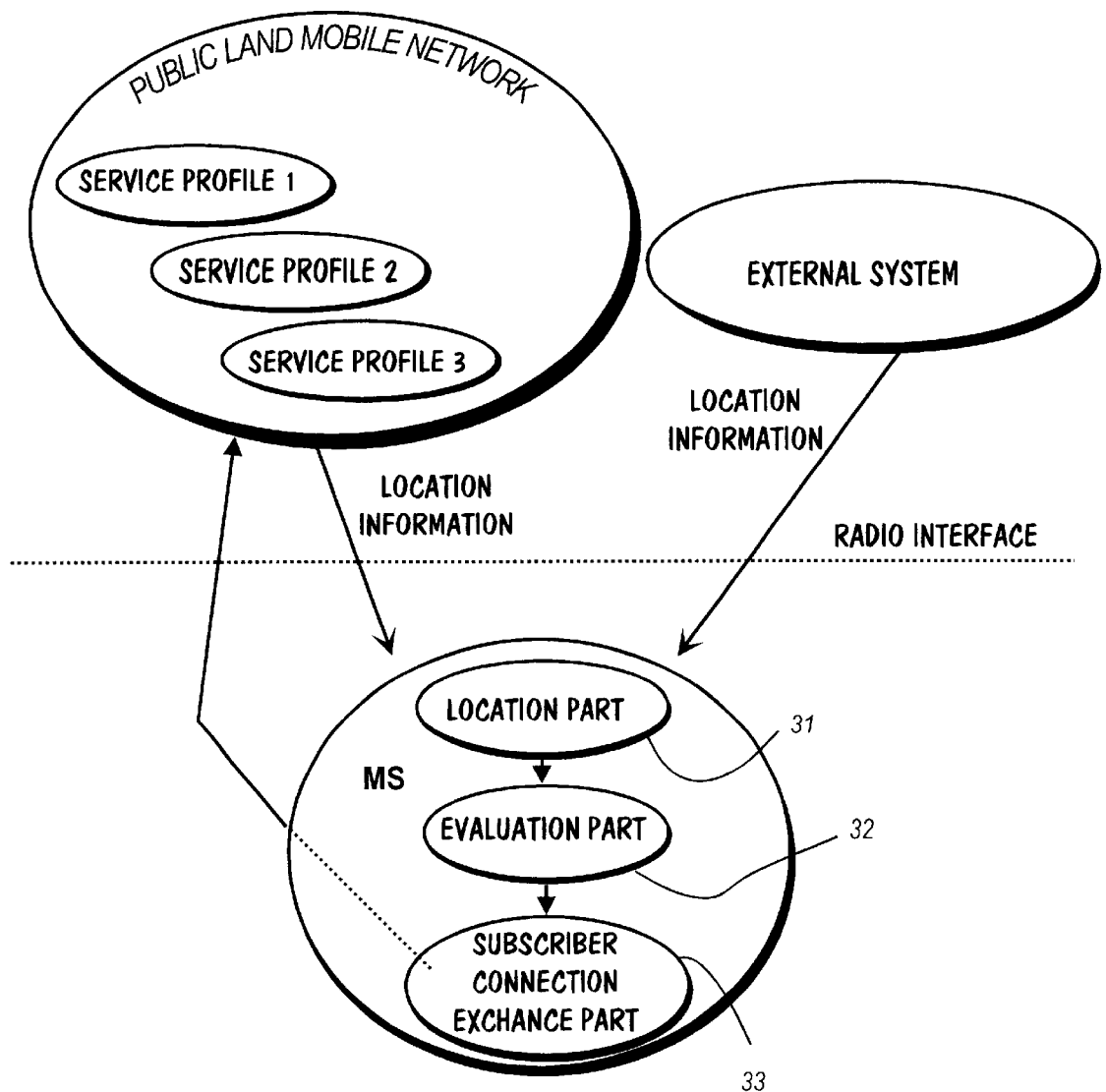
FIG. 3 is a reduced view of the functional parts of a system according to the invention.

FIG. 3 shows the basic parts of the invention. In the home location register HLR of the PLMN system, where permanent subscriber information is maintained, two or more service profiles, in the figure service profiles 1, 2 and 3, are established for the same subscriber. Only one service profile at a time may be active.

Figure 4:
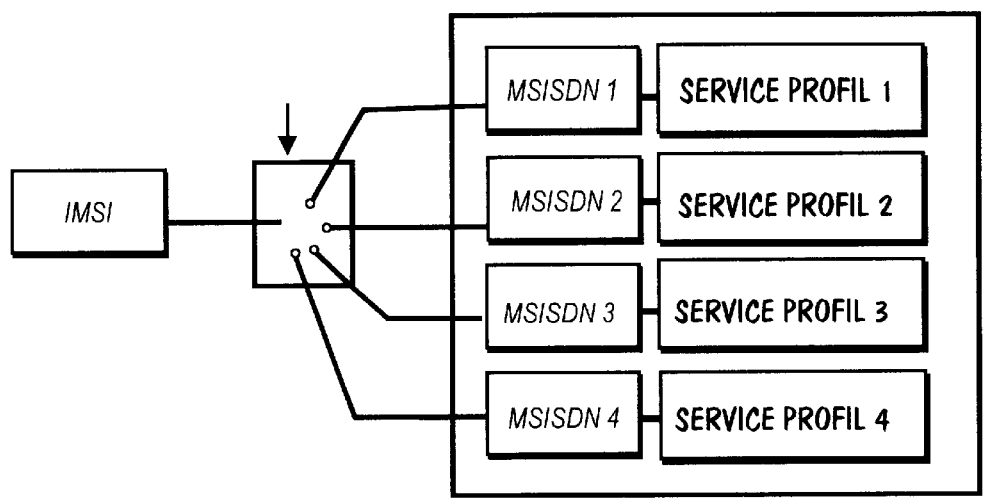
FIG. 4 shows a possible connection arrangement.

Tying of the service profile to the subscriber connection in the home location register may be implemented in different ways. The procedure may e.g. be the same as is proposed in U.S Pat. No. 5,657,373. There the subscriber number remains the same, but the IMSI number changes, but in this application the procedure may be such that the IMSI remains the same while the subscriber number changes. The idea hereby is as shown in FIG. 4. To each subscriber number MSISDN 1, ..., MSISDN 4 is connected a certain service profile, to number MSISDN 1 is connected the service profile "service profile 1", etc. The subscriber connection always contains both a subscriber number and an IMSI number. Thus, complete connection information may be brought about in such a way that the control, which functions in response to the subscriber number stated by the mobile station, connects an IMSI number with the given subscriber number and thus with the service profile. The resulting subscriber record thus contains a desired combination of IMSI+MSISDN+service profile. It should be noted that in this example the IMSI number is the same in all combinations, because the subscriber is identified as being the same by this number.

It is also possible to proceed in such a way that service profiles in the home location register are tied to the IMSI number, whereby the subscriber has several IMSI numbers but only one subscriber number. This is in fact the procedure used in the US patent mentioned above. Hereby FIG. 4 is replaced by a figure, where the IMSI box is replaced by the MSISDN box and the MSISDN n box is replaced by the IMSI n box.

The procedure may also be such that there are several subscriber records, each one with its own IMSI and MSISDN numbers and service profile. As seen from the network's viewpoint, these are separate subscriber connections, which are not tied by anything to one another and to a certain subscriber. Tying takes place in charging only. This procedure is easiest to implement in existing networks, because no changes need be done in the home location register.

The following is a description by way of example of a system, where the subscriber has several MSISDN numbers but one and the same IMSI number.

Reference is still made to FIG. 3. Mobile station MS includes three functional parts: location part 31, evaluation part 32 and connection exchange part 33. All these parts are preferably located on subscriber identity module SIM, whereby the subscriber may use any subscriber equipment.

The duty of the location part is to make clear the location of the subscriber, that is, of the mobile station in the network. For this purpose any known application may be used. The location part receives in two ways the information needed for determination of the location: either from public land mobile network PLMN or then from some external system.

The first-mentioned way is based on the fact that in all known public land mobile networks the base transceiver stations transmit information about themselves and about their environment in a signal, which depending on the system may be called e.g. a beacon signal, a broadcasting signal, a pilot signal, or by some other corresponding name. The information contains, among other things, the MCC (Mobile Country Code), the MNC (Mobile Network Code), which identifies the operator, the CI (Cell Identity), adjacent cell information and location area identifier LAI. The mobile station constantly decodes the parameters listed above from the signals of nearby base transceiver stations, so anyone of this alone or a combination of desired parameters may be used as location information.

Thus, the location area is formed by one parameter or by a set of parameters. By establishing the parameter values beforehand the desired location areas are defined. Settings as shown in the following table could be used as an example:

| | |
|---|---|
| Location area 1 | MCC = 17 |
| Location area 2 | MCC = 17, LAC = 34 or 35 or 36 |
| Location area 3 | MCC = 17, LAC = 36 or 37 |

The location part finds out whether the received parameters meet these location area definitions, and if they do, it makes this known to the evaluation part. The information may be either a set of parameters as such or then a single character, such as 1, 2 or 3, which refers to the location area.

The cell identity alone may of course be used as location information. In a densely populated areas, however, the cells are small in size and therefore position fixing with cell precision is not very practicable.

Another method is based on the circumstance that the mobile station defines its location in a manner independent of the PLMN network by using some outside system. Such a system could be e.g. the known GPS (Global Positioning System). Hereby the location entity contains a GPS receiver.

If the location area is formed by a set of parameters, then it is a rather complicated operation to perceive a move from one area to another. It is easier, if a location area ("location area" like in Location Area Identity LAI) or a combination of these is used as the location area. A location area is used as an example hereinafter in the text, but it should be noted that the invention is by no means limited to the use of the location area as a measure of location information.

Figure 1:
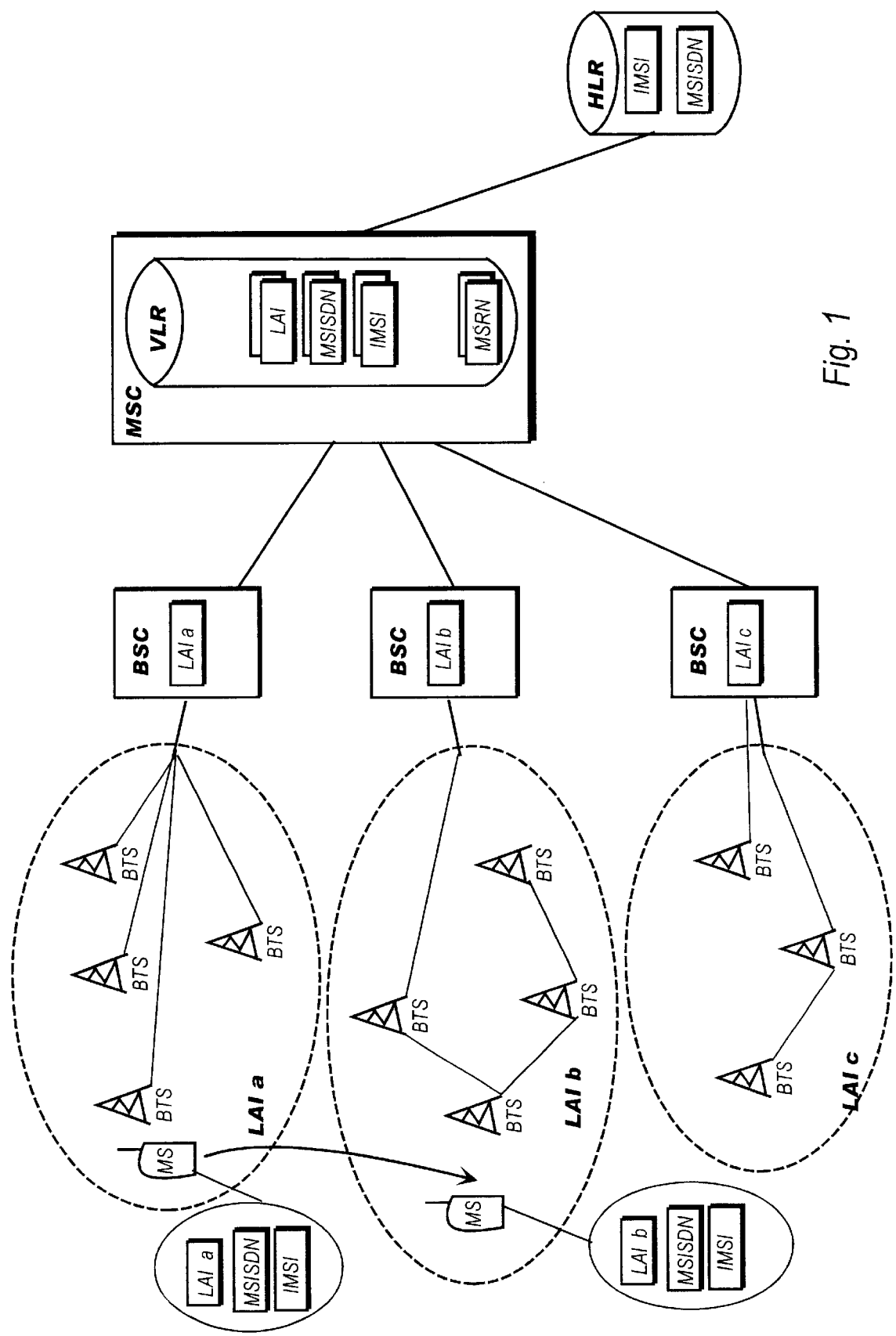
FIG. 1 shows networks elements of a PLMN system.
Figure 2A:
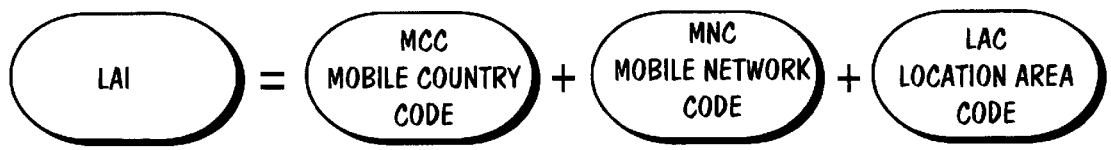
FIG. 2A illustrates the contents of the location area identity.
Figure 2B:
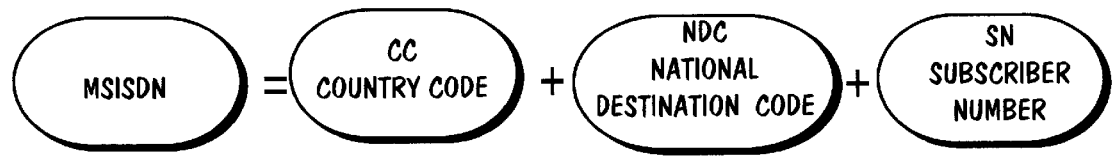
FIG. 2B illustrates the contents of a subscriber number.
Figure 2C:
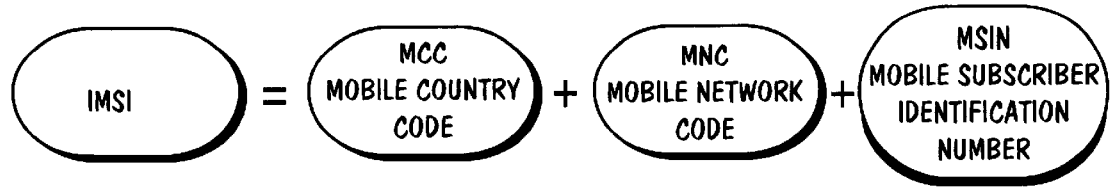
FIG. 2C illustrates the contents of an international mobile subscriber identity.

As is shown in FIG. 1, digital PLMN systems contain the feature that current location area identity LAI is known to the mobile station, or more exactly, it is in the memory of mobile equipment ME. This feature may be used directly to advantage in such a way that such a function is arranged by which location area identity LAI is transferred to the location part on the subscriber identity module.

If the system is a GSM system, the location part may be implemented in the following manner:

In the further specification of the GSM system carried out by ETSI (European Telecommunications Standards Institute), in the so-called Phase 2+, the SIM module functions are considerably enlarged compared with the original. The new definitions are shown in detail in the specification GSM 11.14 "Digital cellular communications system (Phase 2+); Specification of the SIM Application Toolkit for the Subscriber Identity Module-Mobile Equipment (SIM-ME) Interface". Therein those mechanisms are defined which allow applications on the SIM module to be in cooperation and to function together with any mobile equipment ME supporting these functions. An important feature is the Call Control by SIM which is described in item 9 of the specification. When this function is activated on the SIM module, then call control in the mobile station will take place under control by the SIM module.

In addition, Phase 2+ in items 6.4.15 describes the command PROVIDE LOCAL INFORMATION, by which the SIM requests of the mobile equipment to provide the current location information. When the SIM gives this command to the mobile equipment, it gives the reply TERMINAL RESPONSE, which contains the MCC (Mobile Country Code), the MNC (Mobile Network Code), the LAC (Location Area Code) and the CI (Cell Id).

In addition, in Phase 2+ there is a definition of the command DISPLAY TEXT, which the SIM gives to command the mobile equipment to display the desired text on the equipment display screen.

It is advantageous in the implementation of the invention to use these new features of the SIM-ME interface which are defined in Phase 2+.

Figures 5, 7:
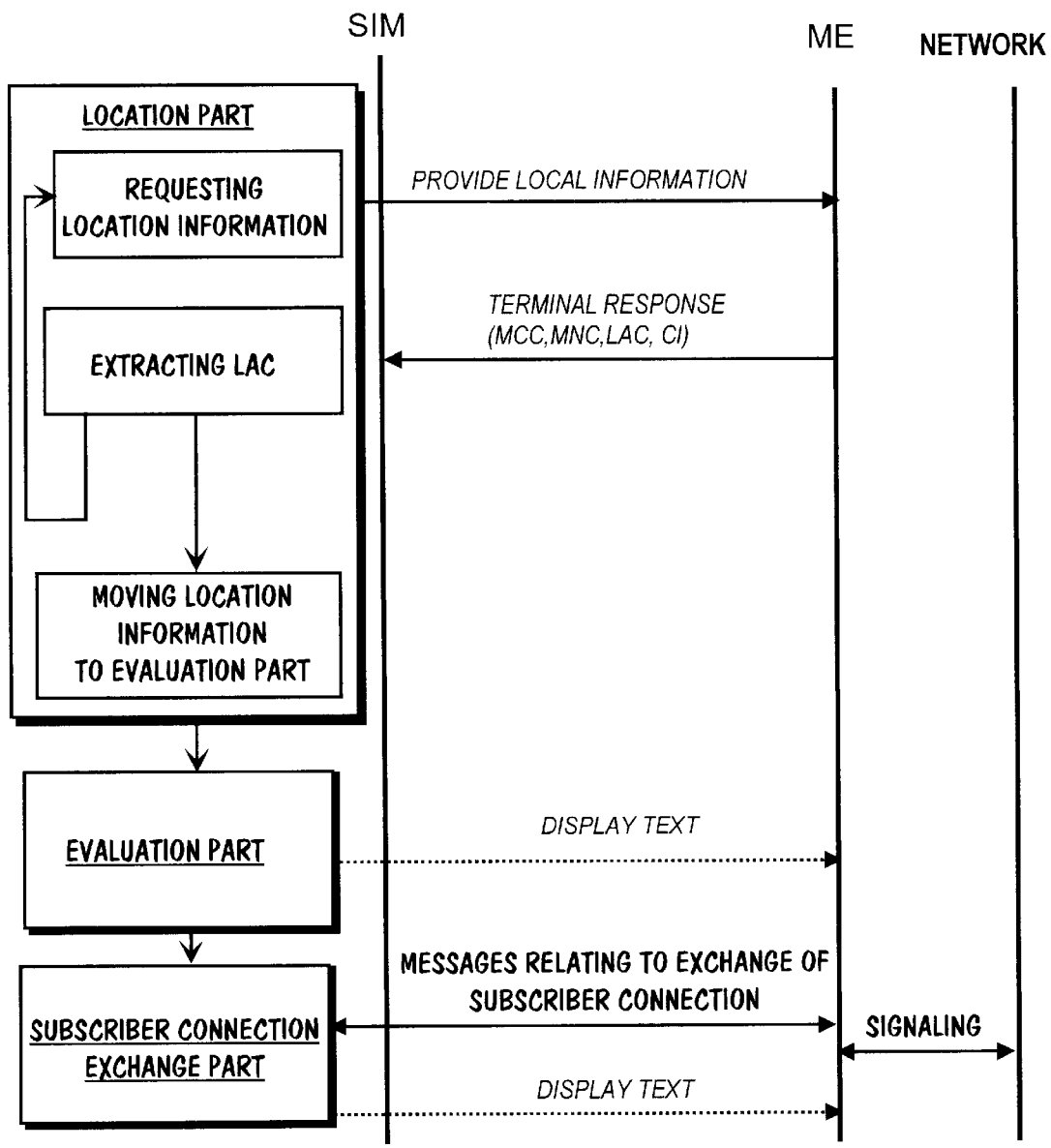
FIG. 5 illustrates an embodiment.
FIG. 7 shows the contents of a memory.

Referring to FIG. 5, the working of the location part is described with the aid of the above-mentioned GSM concepts. The figure shows functions of the location part as well as messages to be exchanged between the SIM module, mobile equipment ME and base transceiver station BTS.

The location part, which is a suitable program, is implemented with the SIM module. At regular intervals $\Delta T$ the location part requests location information by sending the message PROVIDE LOCAL INFORMATION to mobile equipment ME. In response to the message, the mobile equipment sends the message TERMINAL RESPONSE, which contains the MCC (Mobile Country Code), the MNC (Mobile Network Code), the LAC (Location Area Code) and the CI (Cell Id). The location part distinguishes location area code LAC from the message. It may check whether the LAC is the same as on the previous occasion. If the location area code has changed, it will only send changed LAC identifier to the evaluation part. Another possibility, of course, is that it always sends at $\Delta T$ intervals location area identity LAI to the evaluation logic and lets this carry out the further actions. The latter method is used in this case presented as an example.

Figure 6:
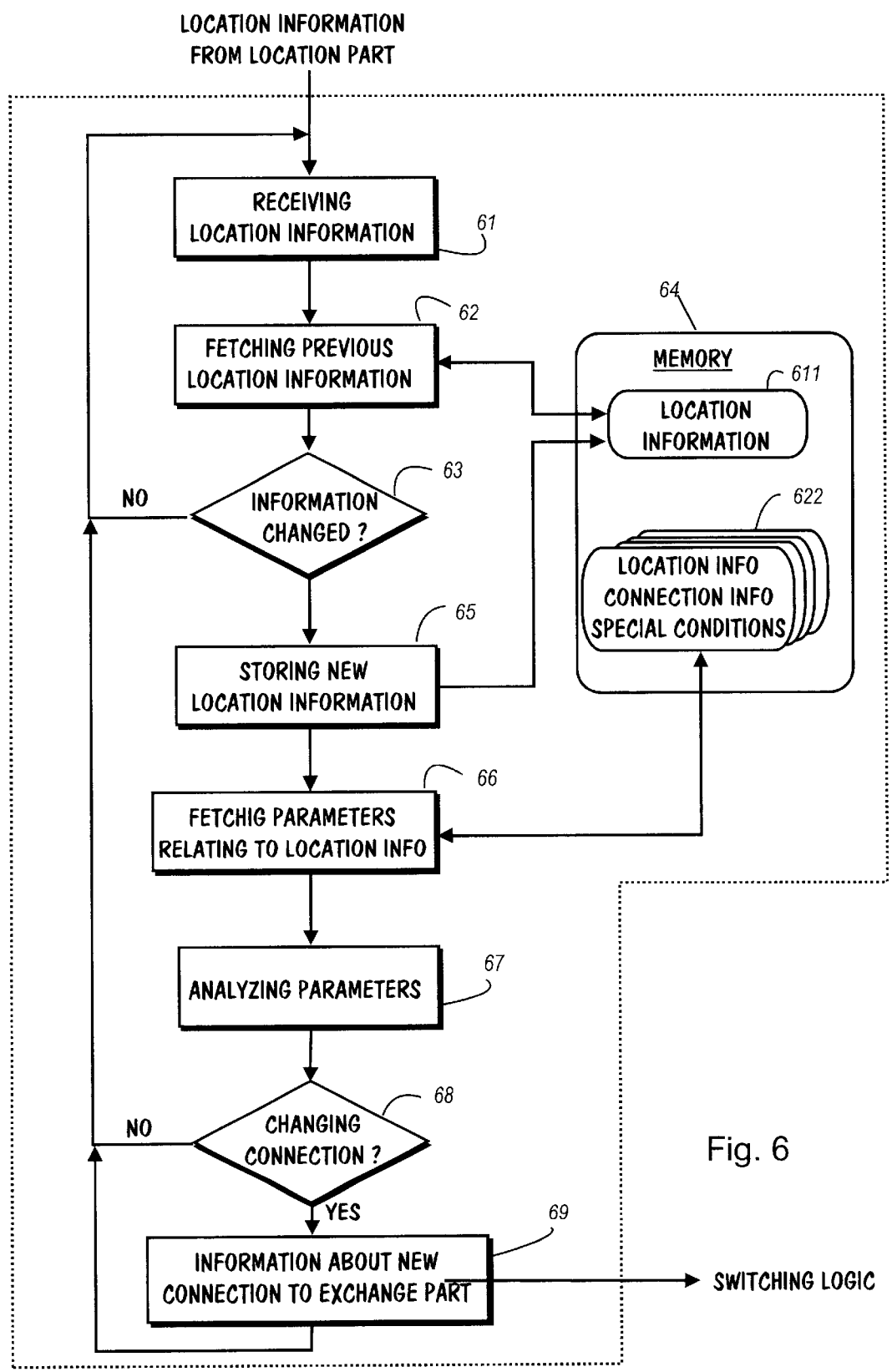
FIG. 6 is a functional diagram of the evaluation part.

The general operating principle of the evaluation part is described in FIG. 6. When the evaluation part has received the location information given by the location part, step 61, it will first check whether the location information has changed compared with the earlier location information. It fetches earlier location information 611 from memory 64 and compares it with the information it has just received, step 64. If the new location information is identical with the old, the evaluation part will remain waiting for new location information from the location part. If the location information has changed, the evaluation part will store the new location information, step 65, in memory location 611, replacing the earlier information with it.

Thereafter the evaluation part searches the memory for those parameters relating to the location information which are the connection information and the related special conditions. The information may be in table form according to FIG. 7, where one line (record) contains location area code LAC as location information, the MSISDN number as connection information and the special conditions relating to the connection.

The evaluation part analyses the fetched parameters, step 67, and based on the analysis it decides whether the connection must be exchanged, step 68. It checks the subscriber number, and if the number is the same, the connection will not be exchanged, but the following location information will be received. Depending on the table the codes of all location areas in the network may be contained in it, and it is even possible that the same profile and thus the same subscriber number is used in several location areas.

If the subscriber number is different from the one currently used, then e.g. in table 7 a move has occurred from location area LAC b to location area LAC c, so the subscriber number parameter has changed MSISDN 2→MSISDN 3, and the evaluation part checks the special conditions "Special Conditions 3" relating to the concerned record in the table. Limitations may be set up in these for an exchange of the connection. For example, a limitation may be such that after a change of the location area code a sufficient number of locations must be made which give the same result. Such a suitable delay, that is, a hysteresis, is required so that an exchange from one connection to another will not constantly take place in location area margins. In addition, it is possible in the special conditions to state that the connection must not be exchanged while a call is going on, when sending a short message, etc. When the limitations set up by the special conditions have disappeared, the evaluation part makes a decision to exchange the connection, step 68. It may inform the mobile user of this by sending a "Display Text" message (FIG. 5) to the terminal equipment, which in response to the message will show e.g. the text "CONNECTION IS EXCHANGED FOR ANOTHER, WAIT" in the display of the mobile equipment.

Thereupon the evaluation part sends to the connection exchange part a command to exchange the connection for another. The command contains the MSISDN number of the new connection.

Figure 8:
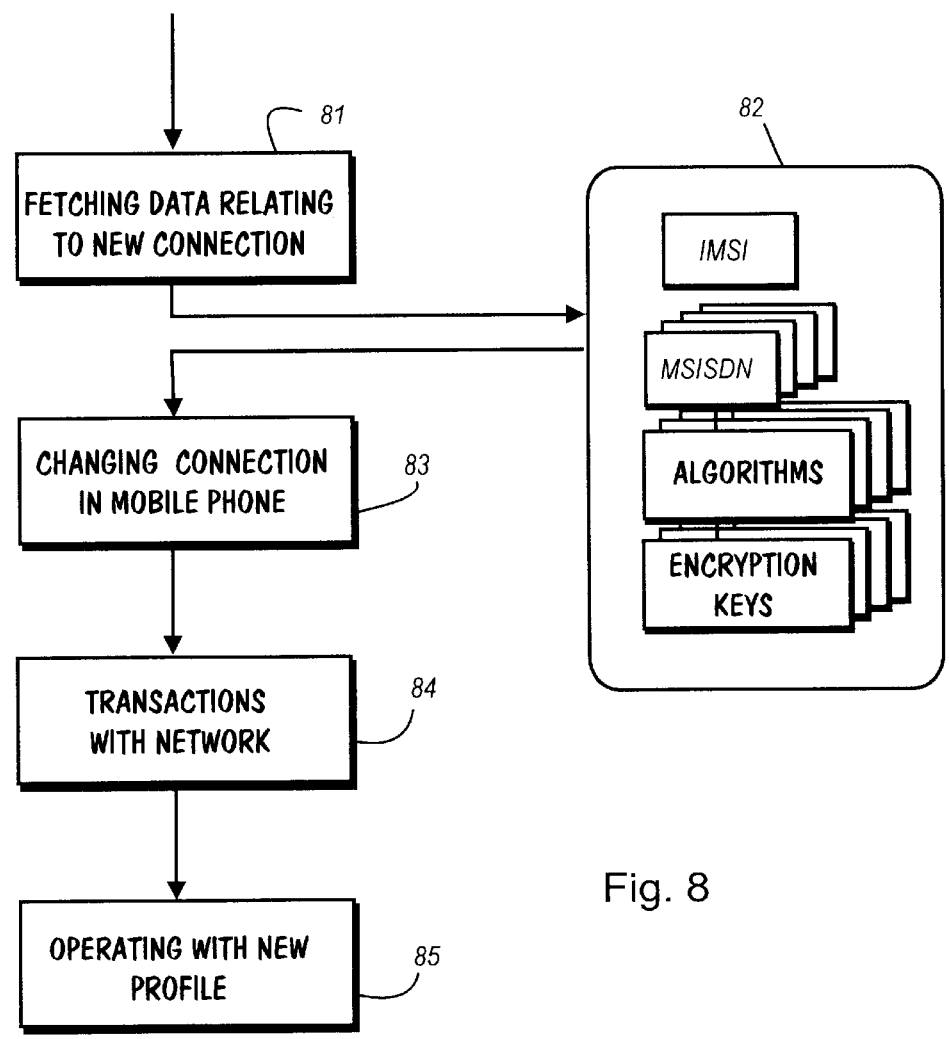
FIG. 8 is a functional diagram of the connection exchange part.

FIG. 8 shows the operation of the connection exchange part. When it receives the connection exchange command from the evaluation part, it starts the exchange, step 81, by searching memory 82 for any information relating to the new connection. The memory contains the subscriber's all subscriber numbers and the related information. The MSISDN number given by the evaluation part functions as a search key. It was assumed in this example, that the IMSI number remains the same, although the MSISDN number changes. When the MSISDN number of the connection changes into another, those algorithms and encryption keys will also change which are needed for authentication and encryption. In the memory they are in the same record as the MSISDN number, so the outcome of the memory search is that the connection exchange part has all the necessary information relating to the new connection.

Thereafter the connection exchange part begins such transactions with the network, step 84, wherein the registration into the network maintained with the old MSISDN number is finished and a new registration is made with the new MSISDN number. The transactions are PLMN system-specific and they are not described in any greater detail herein.

Following a successful exchange of connection the user may be informed about this by sending a "Display Text" message (FIG. 5) to the terminal equipment, which in response to the message shows e.g. the text "CONNEC- TION EXCHANGED" on the display of the mobile equipment. This message may also be used for giving a brief description of the service profile now available.

Thereafter the user will act with a new service profile, step 85.

It was assumed in the foregoing description of the invention that the IMSI number remains the same, but the MSISDN number changes. This embodiment requires some changes on the PLMN network side. The easiest embodiment in networks of today is such that when the connection exchange is made the connection in question is an entirely new one, of which there is a separate subscriber record for each in the home location register HLR.

Hereby, when leaving the network with information of the old connection, registration into the network will be as a new subscriber. In the memory according to FIG. 8 each MSISDN number hereby has its own relating IMSI number.

Figure 9:
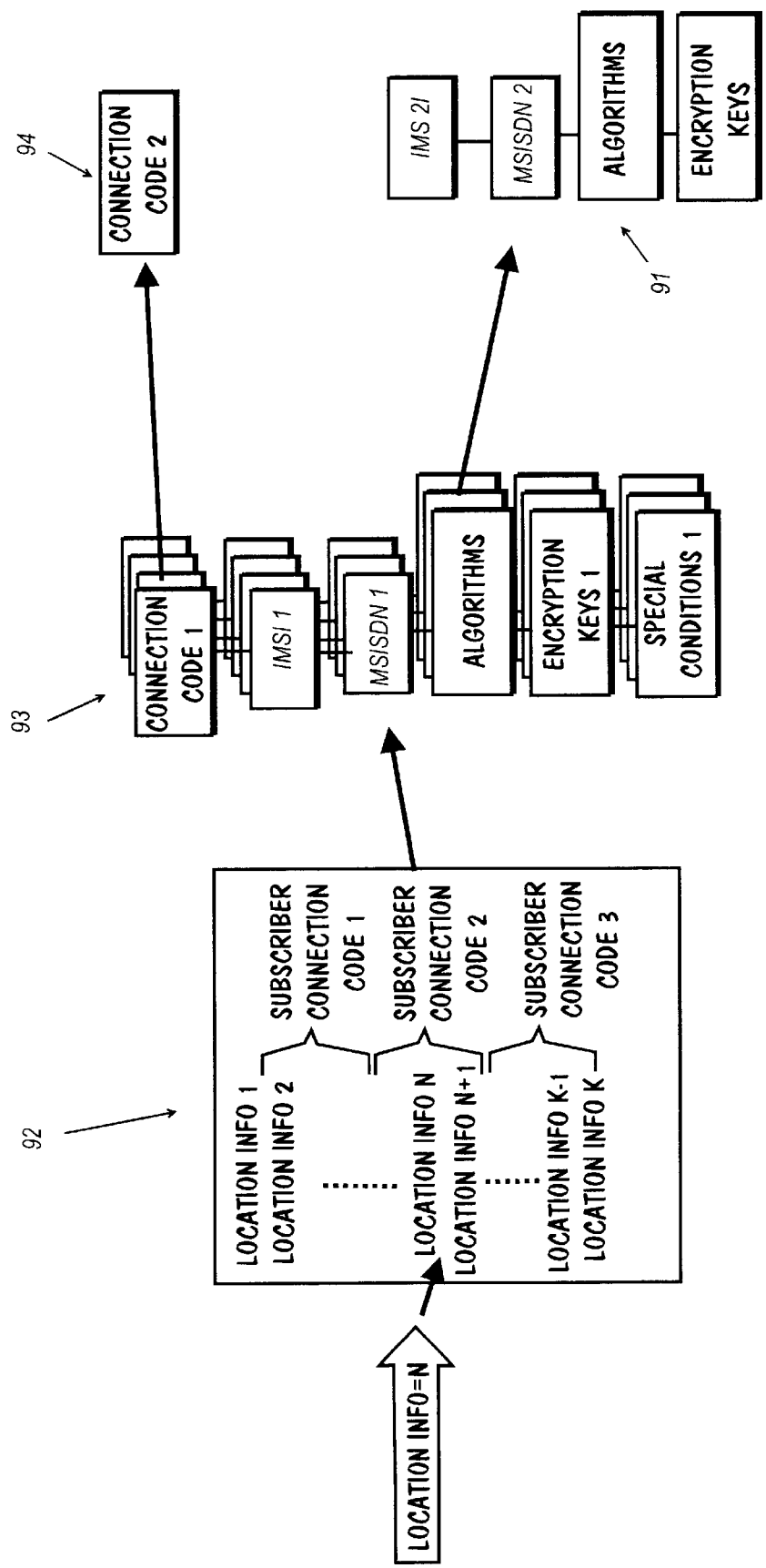
FIG. 9 illustrates a possible memory arrangement.

FIG. 9 is a simplified view of another possible operation of the evaluation part and the connection exchange part in a case where each MSISDN number has its own relating IMSI number and where the mobile communications system is the GSM system.

The different parts of the invention are implemented on the subscriber identity module SIM. In the GSM system, the location part is an appli cation which is located on the SIM module and which uses Application Tool-kit commands and which at fixed intervals performs a PROVIDE LOCATION INFORMATION command in accordance with the TS GSM 11.14 version 5.1.0, or some corresponding command, and stores the received CGI value of the cell as such on the SIM module in a special file reserved therein. The parts of the cell's CGI (Cell Global Identification) are the MCC (Mobile Country Code), the MNC (Mobile Network Code) and the LAI (Location Area Identifier).

The evaluation part contains special file 92, wherein the CGI values of the network are divided into groups formed by the geographical area, and each group has a connection code stated by one integer number. The evaluation part searches file 92 to find out which connection code corresponds with the CGI value given by the location part, here the location information is n. In the figure the connection code is 2. Thereupon the evaluation part based on the connection code fetches information about the new connection from another file 93, which contains information on the connection related to each connection code. In this example, corresponding with connection code 2, it obtains as connection information "IMSI 2, MSISDN 2, algorithms, encryption keys 2. A". The fetched connection information is stored in its own special file 91, from which information on the current connection is thus always available. The connection information may also be stored by storing the connection code alone in file 94.

The mobile equipment now registers with the new connection by performing the REFRESH command defined in TS GSM 11.14 version 5.1.0., which leads to initialization of the SIM module and at the same time to a connection exchange.

The practical implementation of the invention may be done in many ways keeping within the attributes of the claims. The information in the memory may be as one file or as several files and the mode of presentation of individual information can be chosen freely. The functional interface between the location part and the evaluation part may be some other than the one in the examples described above and the functional details themselves need not be of the kind described above.

What is claimed is:

1. Method of changing the service profile of a mobile subscriber in a public land mobile network, in which to each subscriber connection may be connected a service profile including desired subscriber services and the location of the mobile station is known with at least location area precision, the method comprising:

storing in the mobile station beforehand several pieces of area information, each of which corresponds with its own partial area of the coverage area of the public land mobile network and information on several subscriber connections so that a separate piece of subscriber connection information relates to each piece of area information;

determining periodically in the mobile station location information of the mobile station, when it is in connection with the public land mobile network using one of the subscriber connections and thus one of the service profiles;

evaluating in the mobile station on the basis of the determined location information whether the mobile station has moved from the partial area relating to the current area information into a partial area relating to new area information; and if the mobile station has moved into a partial area relating to new area information, disconnecting the mobile station from the public land mobile network and reconnecting the mobile station to the public land mobile network using subscriber connection information relating to the new area information and thus a new service profile.

2. The method of claim 1, wherein the area information includes at least one parameter, which the mobile station has decoded from such a signal sent by the public land mobile network, by which the public land mobile network gives network information to the mobile station.

3. The method of claim 1, wherein the area information is the location area identity and the corresponding partial area of the public land mobile network is the location area;

the location area identity sent by the public land mobile network is used as location information; and when the location area identity changes, it is deduced that the mobile station has moved from one partial area into another.

4. The method of claim 1, wherein the area information is a set of location area identities and the corresponding partial area of the public land mobile network includes location areas individualized by these identifiers;

the location area identity sent by the public land mobile network is used as location information; and when the location information indicates that the location area identity belongs to a different set of identities than the previous location area identity, it is deduced that the mobile station has moved from one partial area into another.

5. The method of claim 1, wherein the area information is a set of cell identities and the partial area of the public land mobile network corresponding with the area information includes cell areas individualized by the cell identities;

the cell identity sent by the public land mobile network is used as location information; and when the location information indicates that the cell identity belongs to a different set of cell identities than the previous cell identity, it is deduced that the mobile station has moved from one partial area into another.

6. The method of claim 1, wherein reconnection to the public land mobile network using the exchanged subscriber connection is carried out only when a predetermined number of successive location determination periods have indicated that the mobile station is in a new partial area.

7. The method of claim 1, wherein the subscription information contains all that information which is required for the subscriber to gain access to the public land mobile network.

8. The method of claim 1, wherein
in the subscriber connection information stored beforehand in the mobile station, special condition information is also contained for each piece of subscriber connection information; and
before disconnection from the public land mobile network a check is made to find out whether the special conditions make any limitations on the disconnection.

9. The method of claim 1, wherein the subscriber connection information contains both the mobile subscriber's international ISDN number (MSISDN) and the international mobile subscriber identity (IMSI), one of which remains the same although the subscriber connection is exchanged.

10. The method of claim 2, wherein the area of information is the location area identity and the corresponding partial area of the public land mobile network is the home area;
the location area identity sent by the public and mobile network is used as location information; and
when the location area identify changes, it is deduced that the mobile station has moved from one partial area to another.

11. The method of claim 2, wherein the area information is set of location area identities and the corresponding partial area of the public land mobile network includes location areas individualized by these identifiers;
the location area identity sent by the public land mobile network is used as location information; and
when the location information indicates that the location area identity belongs to a different set of identities than the previous location area identity, it is deduced that the mobile station has moved from one partial area to another.

12. The method of claim 2, wherein the area information is a set of cell identities and the partial area of the:public land mobile network corresponding with the area information includes cell areas individualized by the cell identities;
the cell identity sent by the public land mobile network is used as location information; and
when the location information indicates that the cell identity belongs to a different set of cell identities than the previous cell identity, it is deduced that the mobile station has moved from one partial area into another.

13. System for changing the service profile of a mobile subscriber in a public land mobile network, the system comprising:
a home location register for storing permanent subscriber information comprising a service profile including the subscriber services relating to each subscriber connection;
a mobile station formed by a piece of terminal equipment and a subscriber identity module SIM inserted into it;
wherein the home location register comprises several service profiles in the subscriber information, each of which is available in a partial area of its own of the coverage range of the public land mobile network;
wherein the mobile station comprises:
a location part, configured to periodically determine the location of the mobile station in the public land mobile network and give location information as the result;
an evaluation part, configured to determine in response to the location information whether the mobile station has moved from one partial area into another and when a move has taken place to give a connection exchange command;
a connection exchange part, configured to search in response to the connection exchange command the memory for the subscriber connection information established for the new partial area, to disconnect the mobile station from the public land mobile network and to reconnect the mobile station to the public land mobile network using the subscriber connection information established for the new partial area, whereby trafficking continues in the new partial area with the changed service profile.

14. The system of claim 13, wherein the location part is configured to separate the location information from that broadcast signal sent by the serving base transceiver station, by which the base transceiver station gives information about itself and about the network.

15. The system of claim 13, wherein the mobile station further comprises a memory for use together with the evaluation part, wherein connection information corresponding with the partial area information is stored in advance, and also an evaluation logic which in response to the location information checks whether it refers to new area.

16. The system of claim 15, wherein the memory also stores such special conditions relating to each subscriber connection, wherein those conditions are established, on the fulfillment of which the evaluation logic may give a connection exchange command.

17. The system of claim 15, wherein the evaluation logic is configured to compare the current location information with the earlier location information, which is stored in the memory, and when these pieces of information differ from each other the evaluation logic is configured to search the memory or the connection information and special conditions relating to the current location information.

18. The system of claim 16, wherein the evaluation logic is configured to compares the current location information with the earlier location information, which is stored in the memory, and when these pieces of information differ from each other the evaluation logic is configured to search the memory for the connection information and special conditions relating to the current location information.

19. The system of claim 16, wherein the location information is the location area identity and the memory stores location area identities as partial area information.

20. The system of claim 15, wherein the location information includes several parameters from a set including the MCC (Mobile Country Code), the MNC (Mobile Network Code), the CI (Cell Identity) and the LAI (Location Area Identifier), whereby the memory stores a set of parameters as partial area information.

21. The system of claim 13, wherein the mobile station further comprises a memory for use with the connection exchange part, wherein the subscriber connection information established for all partial areas is stored beforehand.

22. The system of claim 21, wherein in response to the connection exchange command given by the evaluation part the connection exchange part is configured to search the memory for new subscriber connection information and to start the connection exchange functions with the public land mobile network.

23. The system of claim 13, wherein the location part, the evaluation part and the connection exchange part are located on the, subscriber identity module (SIM).

* * * * *